US009798647B2

United States Patent
Lindo et al.

(10) Patent No.: US 9,798,647 B2
(45) Date of Patent: Oct. 24, 2017

(54) DISPLAY WINDOW CONTEXTUAL VISUALIZATION FOR APPLICATION PERFORMANCE MONITORING

(71) Applicant: CA, Inc., New York, NY (US)

(72) Inventors: Jonathan B. Lindo, Emerald Hills, CA (US); Seshadri Venkataraman, Union City, CA (US); Vamsee K. Lakamsani, Livermore, CA (US); Harshit Bapna, Sunnyvale, CA (US)

(73) Assignee: CA, Inc., New York, NY (US)

( * ) Notice: Subject to any disclaimer, the term of this patent is extended or adjusted under 35 U.S.C. 154(b) by 60 days.

(21) Appl. No.: 14/928,939

(22) Filed: Oct. 30, 2015

(65) Prior Publication Data

US 2017/0123956 A1 May 4, 2017

(51) Int. Cl.
*G06F 9/44* (2006.01)
*G06F 11/00* (2006.01)
*G06F 11/36* (2006.01)

(52) U.S. Cl.
CPC ...... *G06F 11/3612* (2013.01); *G06F 11/3616* (2013.01); *G06F 9/4443* (2013.01)

(58) Field of Classification Search
CPC .. G06F 3/0482; G06F 3/04842; G06F 9/4443; G06F 11/3612; G06F 11/3616
USPC ............................ 717/124–135; 714/37, 38.1
See application file for complete search history.

(56) References Cited

U.S. PATENT DOCUMENTS

| | | | | |
|---|---|---|---|---|
| 6,467,052 B1 * | 10/2002 | Kaler | ..................... | G06F 11/302 714/39 |
| 2003/0061541 A1 * | 3/2003 | Kaler | ..................... | G06F 11/302 714/37 |
| 2003/0061542 A1 * | 3/2003 | Bates | ................... | G06F 11/3636 714/38.13 |
| 2003/0131286 A1 * | 7/2003 | Kaler | ..................... | G06F 11/302 714/39 |
| 2004/0075690 A1 * | 4/2004 | Cirne | ..................... | G06F 11/323 715/771 |
| 2007/0022407 A1 * | 1/2007 | Givoni | ................ | G06F 11/3414 717/124 |

(Continued)

OTHER PUBLICATIONS

Apperian, Inc., "Definitive Guide to Mobile Application Management", retrieved on Oct. 19, 2015, from https://www.apperian.com/resources/mobile-application-management-guide/, 20 pages.

*Primary Examiner* — Qing Chen
(74) *Attorney, Agent, or Firm* — Gilliam IP PLLC (57) ABSTRACT

A method and system for displaying application performance data. In an embodiment, performance data collected from an application is logically associated with a display window generated by the application. A displayable performance indicator determined. The displayable performance indicator is visually modifiable to correlate to variations in the performance data. A performance category selection signal and a data collection filter metric selection signal are received by a performance analytics display module. The display module simultaneously displays, on a display device, an indicator of a performance category based on the performance selection signal, an indicator of a data collection filter metric based on the filter metric selection signal, and an image of the display window that includes the performance indicator.

20 Claims, 6 Drawing Sheets

(56) References Cited

U.S. PATENT DOCUMENTS

| | | | | |
|---|---|---|---|---|
| 2008/0120543 | A1* | 5/2008 | Cahill | G06F 11/3466 715/700 |
| 2009/0199160 | A1* | 8/2009 | Vaitheeswaran | G06F 11/3414 717/124 |
| 2011/0208759 | A1* | 8/2011 | Zellweger | G06F 17/30398 707/754 |
| 2012/0005658 | A1* | 1/2012 | Bansal | G06F 11/3419 717/128 |
| 2012/0023429 | A1* | 1/2012 | Medhi | G06F 11/323 715/772 |
| 2012/0271837 | A1* | 10/2012 | Kryger | G06F 17/30867 707/751 |
| 2015/0242063 | A1 | 8/2015 | Lindo et al. | |
| 2015/0242623 | A1 | 8/2015 | Lindo et al. | |
| 2015/0242629 | A1 | 8/2015 | Lindo et al. | |
| 2016/0103888 | A1* | 4/2016 | Fletcher | G06F 17/30477 707/722 |
| 2016/0104090 | A1* | 4/2016 | Alekseyev | G06Q 10/06393 705/7.39 |
| 2016/0105338 | A1* | 4/2016 | Fletcher | H04L 43/045 709/224 |

\* cited by examiner

DISPLAY WINDOW CONTEXTUAL VISUALIZATION FOR APPLICATION PERFORMANCE MONITORING

TECHNICAL FIELD

The disclosure generally relates to the field of software application management, and more particularly to displaying context-specific data in association with application display window images for application analysis and evaluation.

BACKGROUND

A variety of software application management solutions address requirements of developers and IT managers to collect and analyze performance information associated with applications. For example, some management solutions used for software development embed an application that is under development with traps for debugging. However, such controlled testing may be inadequate to address issues and problems in a more comprehensive and user-centric manner. Moreover, exponentially expanding numbers and varieties of applications, such as mobile applications, which are often developed and modified using portable software development kits (SDKs), require more comprehensive and flexible performance monitoring solutions and architectures. To address the foregoing requirements, application monitoring solutions may employ components for collecting application performance data and processing results that are displayed using views that aid developers and IT managers to efficiently comprehend operating conditions and trends for various aspect of the applications being monitored.

BRIEF DESCRIPTION OF THE DRAWINGS

Embodiments of the disclosure may be better understood by referencing the accompanying drawings.

DESCRIPTION

The description that follows includes example systems, methods, techniques, and program flows that depict and describe embodiments of the disclosure. However, it is understood that this disclosure may be practiced without one or more of these specific details. Well-known instruction instances, protocols, structures and techniques have not been shown in detail in order not to obfuscate the description.

The embodiments disclosed and described herein provide methods, systems, and subsystems for organizing and displaying performance data in a manner enabling flexible context-specific views of application performance in association with display windows generated by the application. In an embodiment, application performance data is processed with respect to display windows generated by an application and is used to generate performance indicators that are displayed simultaneously with images of the respective display windows. In one aspect, application performance data may be categorized as one or more operational metrics such as display window load time, display window rotate time, network request time, etc. The performance data may also be categorized in terms of user/client interaction with the application and/or with one or more particular display windows generated by the application, such as frequency or length of user access to each of the respective display windows. In another aspect, application performance data may be categorized as one or more application event such as a program or display window crash event. The display window images may be screen capture images and the performance indicators may be visually coded display objects that may be incorporated within or overlayed with a display window image. Visually overlaying performance indicators onto respective application display windows provides a comprehensive and actionable view of application performance. Furthermore, visually displaying categorization of such overlaid application performance indicators in a user interface (UI) environment in which alternate categorizations are readily selectable, enables flexible contextual visualization in which transactional as well as technical issues can be efficiently identified.

In an embodiment, performance data is collected over intervals defined by sequential display window activation that operationally corresponds to navigation between display windows within the application. The performance data may be detected by monitoring agents that are installed on client devices in a manner so as to be integrated or otherwise logically associated with one or more applications. The performance data may otherwise be generated by or computed from lower level operational data detected by the monitoring agent. The performance data may be transmitted by multiple application clients over a network to a centralized collection server that stores and/or processes cumulative performance data for an application in association with display window identifiers (IDs). In an embodiment, the collection server is accessed by a performance monitoring client to retrieve performance data associated with a specified application. The performance monitoring client may include a UI utilized for selecting a performance category and a data collection filter metric. The performance category may be selected from among an operational metric category (e.g., display window load time), an operational event category (e.g., display window freeze), and/or a client application transaction category (e.g., numbers of accesses to each of multiple display windows).

The performance data collected in contemporaneous association with active display windows may also be categorized in terms of user/client transactions, such as total or relative frequency of access to one or more of the application display windows. Similar to detection of operational metric performance data, such transactional performance data may be detected by monitoring agents that are installed on client devices in a manner so as to be integrated or otherwise logically associated with one or more applications.

In an embodiment, the performance monitoring client receives a performance category selection signal and a data collection filter metric selection signal and displays indications of values received in each selection signal. Furthermore, the performance monitoring client displays multiple display window images that each include a respective performance indictor. In this manner, the performance monitoring system generates an application display window map that may, for example, provide a useful precursor for more detailed subsequent quantitative analytics.

Figure 1:
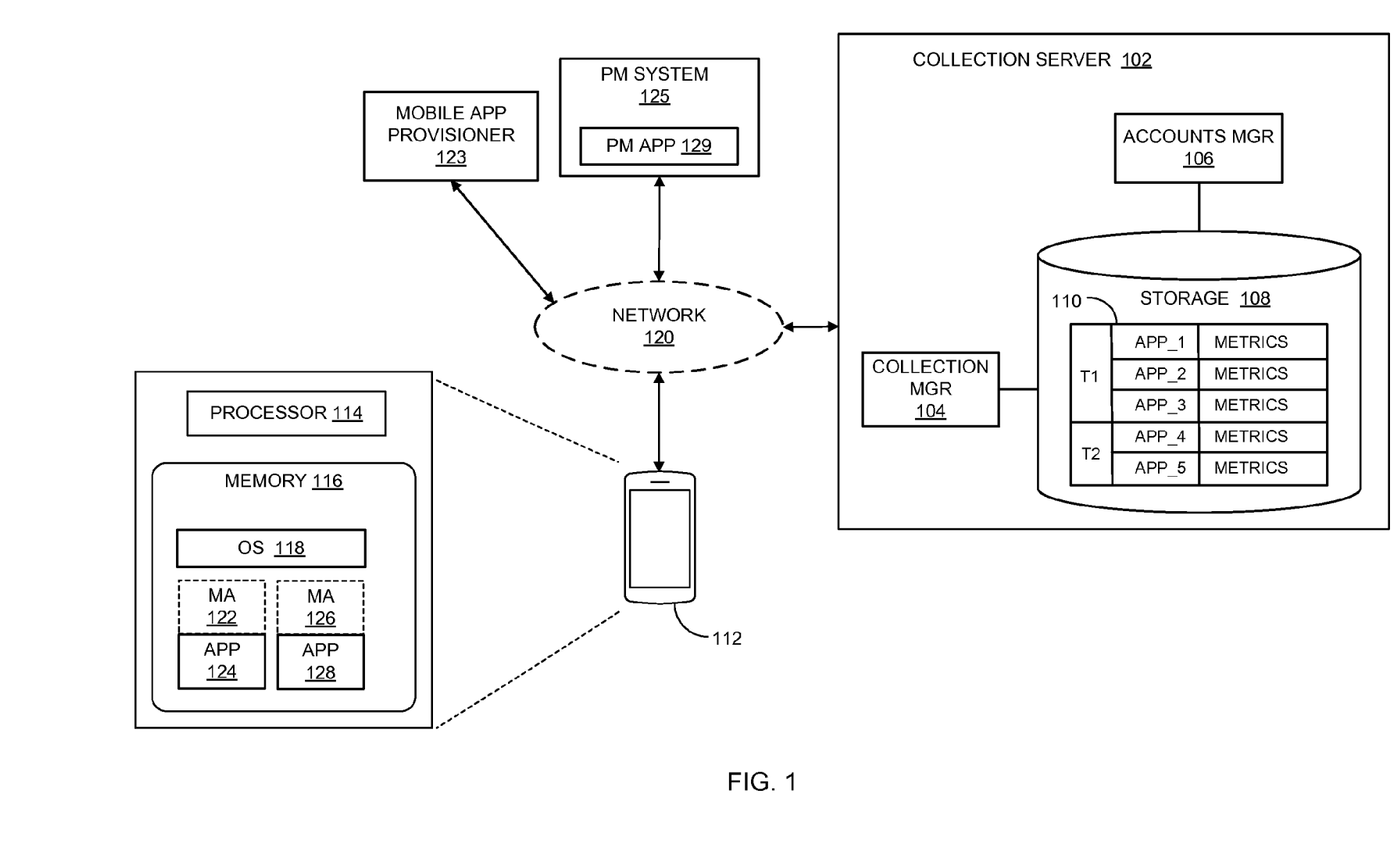
FIG. 1 is a high-level diagram depicting systems and devices that are included in or may interact with an application management system in accordance with an embodiment.

FIG. 1 is a high-level diagram depicting systems and devices that are included in or may interact with an application management system in accordance with an embodiment. The systems include a network 120 that provides connectivity over which a collection server 102 communicates with a mobile device 112 and a performance monitoring system 125. Network 120 also provides connectivity between mobile device 112 and a mobile app provisioner 123. The connectivity may be established by multiple sub-networks and different types of network components, connection media and protocols, and carrier services such as fiber optic cables, telephone lines, Ethernet 802, and Internet protocols. In one aspect, network 120 enable communications between mobile device 112 and mobile app provisioner 123 to enable mobile device 112 to request and obtain software downloads, such as mobile app downloads, from mobile app provisioner 123.

Mobile device 112 may be a smartphone other type of mobile phone or highly integrated portable device having network connectivity via a network interface. In addition to a network interface, mobile device 112 includes a processor 114 and an associated system memory 116 that stores data and system and application software including applications 124 and 128. Processor 114 and memory 116 provide information processing capability necessary for network communications and furthermore to enable mobile device 112 to perform other information handling tasks related to, incidental to, or unrelated to the methods described herein. An operating system (OS) 118 is maintained within system memory 116. OS 118 may be a flexible, multi-purpose OS such as the Android OS found in smartphones and may generally comprises code for managing and providing services to hardware and software components within mobile device 112 to enable program execution.

As explained in further detail with reference to FIG. 4, mobile device 125 may include software applications and monitoring software comprising program instructions for detecting performance data, including operational events, and sending the data to collection server 102. Specifically, and as shown in FIG. 1, each of mobile applications 124 and 128 is instrumented with monitoring agents 122 and 126 respectively.

In communicating performance data updates to collection server 102, mobile device 112 may operate as an initiator device, initiating an update transaction with an update request. Alternatively, collection server 102 may request performance data updates via a centralized hub (not depicted) to which mobile device 112 is a subscriber. In either case, collection server 102 includes a collection manager 104 that processes received performance data updates from clients such as monitoring agents 122 and 126, and stores the data within a storage device 108. In the depicted embodiment, the data stored within storage device 108 is logically organized at a file system or higher level by a database 110. Database 110 may be a relational database, such as an SQL database, or may be an object-based database such as a Cassandra database. In the depicted embodiment, collection manager 104 stores records that associate data with respective applications, such as applications 124 and 128, from which the data was collected via monitoring agents such as agents 122 and 126. To further support logically structured and secure access to the records within database 110, collection server 102 further includes an account manager 106 that interfaces with performance monitoring clients to access application specific data stored by respective client/tenants. To this end, database 110 is structured based on tenants T1 and T2, each of which are associated with a number of application records APP_1-APP_3 and APP_4-APP_5, respectively.

In one aspect, the data collected and stored by collection server 102 may be accessed by performance monitoring system 125 via client requests. For instance, performance monitoring system 125 may send a request for data that includes client/tenant ID, T1, and an application ID, APP_2. In response accounts manager 106, in cooperation with collection manager 104, may utilize the client and application IDs as keys to locate and retrieve performance data (METRICS), contained in or otherwise pointed to by the corresponding database records.

Performance monitoring system 125 includes hardware and software devices and components for communicating with collection server 102 across network 120. Furthermore, performance monitoring system 125 includes a performance monitor application 129, which as described in further detail with reference to FIGS. 2-5, selectively accesses performance data records based on multiple performance-related criteria and displays the data within a performance monitoring display window containing indicators of the selection criteria. Performance monitor application 129 further includes instructions for simultaneously displaying within the performance monitoring display window, images of multiple display screens/windows of an application that have a respective performance indicator overlayed or otherwise visually integrated thereon.

Figure 2:
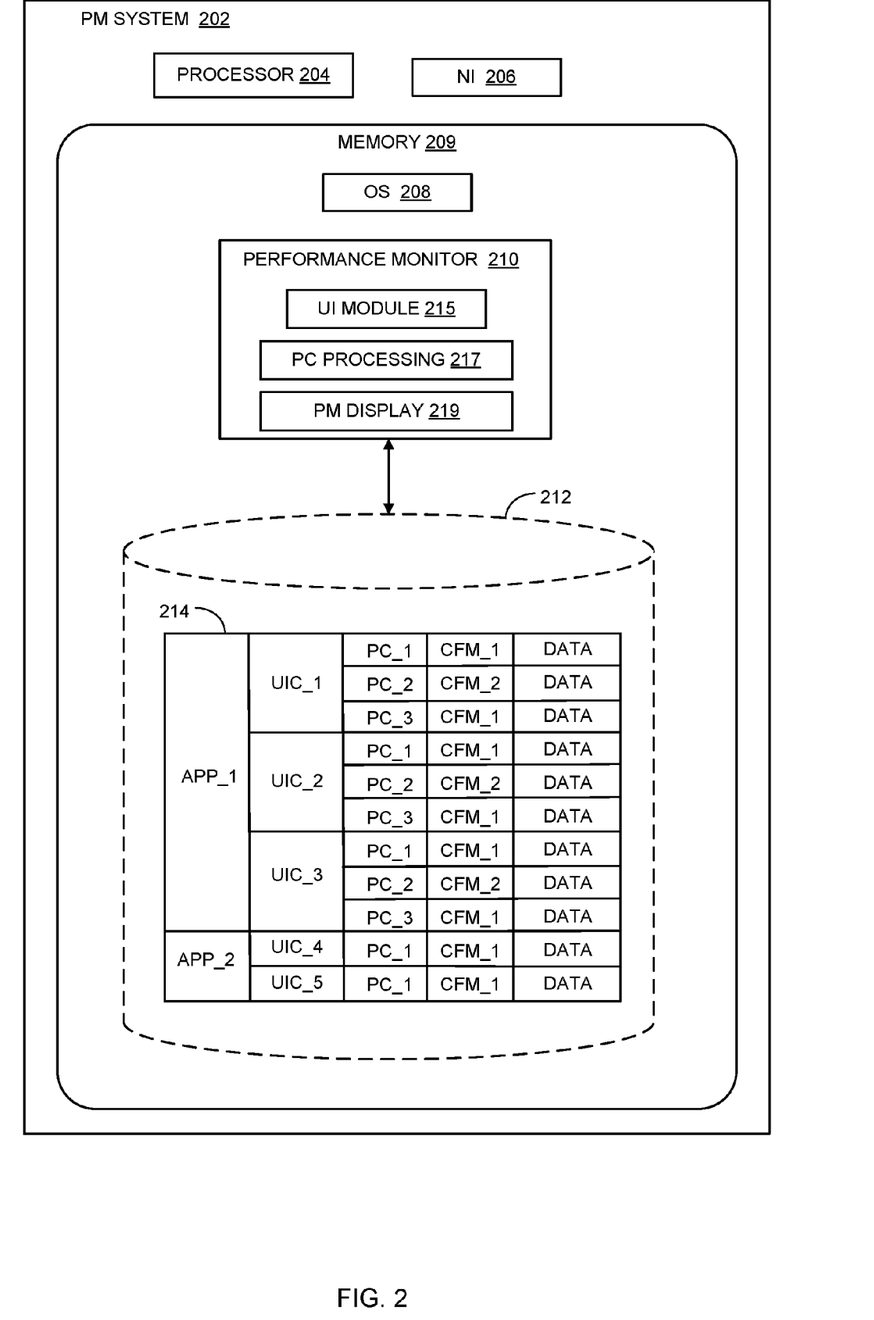
FIG. 2 is block diagram illustrating a performance monitoring system in accordance with an embodiment.

FIG. 2 is block diagram illustrating a performance monitoring system 202 in accordance with an embodiment. Among other devices and components, performance monitoring system 202 includes a network interface 206 enabling communication connectivity with a collection server, such as collection server 102. Performance monitoring system 202 further includes a processor 204 and a system memory 209. Processor 204 may comprise one or more CPUs and may further include one or more GPUs for providing primary system processing such as for generating performance data requests as well as for displaying performance data in accordance with the embodiments herein. System memory 209 provides an execution environment for data retrieved from a collection server or from a local storage. As shown in FIG. 2, an OS 208 is maintained within memory 209 and generally serves to manage and provide services to and an interface among hardware and software components within performance monitoring system 202 to enable program execution.

Further loaded within memory 209 are a performance monitoring application 210 and a database 212 containing database records 214 that may be retrieved and accessed by performance monitoring application 210. Database records 214 are organized per application and per each display window/screen that is generated by a given application. As depicted in FIG. 2, database records 214 include multiple records respectively corresponding to an application, APP_1, and an application, APP_2. Each of application records, APP_1, and APP_2, include multiple display window records. As utilized herein, an application display window or application display screen refers to either or both a displayed window image on a computer display device and/or a container that includes the constituent objects that are displayed within an application display image. An application display window/screen may comprise window content including graphical objects and sub-containers. In the depicted embodiment, the display window IDs used to catalog performance data records are denoted with UI container (UIC) IDs. For instance, the display windows IDs, UIC_1, UIC_2, and UIC_3, designate display windows generated by APP_1, and UIC_4 and UIC_5 designate display windows generated by APP_2.

Each of display window entries UIC_1-UIC_5 include multiple performance data records that each include a performance category (PC) field, a collection filter metric (CFM) field, and one or more data fields (DATA). For instance, display window record UIC_2 for APP_1 includes three data records having PC fields, which contain values, PC_1, PC_2, and PC_3, that each correspond to a specified application performance category. As utilized herein application performance categories are utilized to categorize different types of performance data. For example, PC_1 may correspond to performance data associated with application processing speed and PC_2 may correspond to performance data associated with client interactions with a given display window, such as a number of instances in which a particular application display window is accessed within a specified period.

Each of the data records further includes one or more CFM field values that, like the PC field values, are each logically associated with data contained in the DATA field of the data record. The depicted CFM fields contain values, CFM_1, CFM_2, and CFM_3, that each correspond to a specified data collection filter metric. As utilized herein, a collection filter metric is utilized to designate different criteria by which collection agents, such as monitoring agents, collect performance data. For instance, CFM_1 may correspond to a time point at which the associated DATA was collected and CFM_2 may correspond to a category of application client or a geographical area in which the data was collected.

Together, the app IDs and display window IDs enable performance monitoring application 210 to access collected data corresponding to particular applications and particular display windows within the applications. The use of the performance category and collection filter metric IDs enables performance monitoring application 210 to refine access to and/or processing of the collected data to provide simultaneous display of multiple display window images in conjunction with respective performance indicators and in conjunction with CFM indicators.

Among other program code, performance monitoring application 210 includes a UI module 215, a performance category (PC) processing module 217, and a display output module 219. UI module 215 includes program code for processing signals received via graphical user input objects such as those depicted and described in further detail with reference to FIG. 3. UI module 215 may include instructions for receiving and processing input selection signals that specify a performance category and a data collection filter metric to selectively retrieve and process performance data from among database records 214. For instance, in response to receiving input selection signals specifying an application, APP_1, UI module 215 may generate a request for retrieving all of the data records included within display window records UIC_1-UIC_3 from a remote collection server. PC processing module 217 includes program instructions for processing lower-level performance data to generate higher-level metrics. For instance, category PC processing module 217 may be used to compute an application speed performance metric that includes several performance factors such as network call latency and display window load time. Display output module 219 includes program instructions for generating, storing, and otherwise processing a structured, dashboard display view of selected performance categories, selected collection filter metrics, and a site map of application display windows. For instance, display output module 219 may be used to determine displayable performance indicators, such as color coding, that are visually modifiable to correlate to variations in the performance data. The display output module may further process the logical associations of performance data with display window IDs and utilize those associations in conjunction with the performance indicators to enable context-specific display window visualizations of the performance data as illustrated in FIG. 3.

Figure 3:
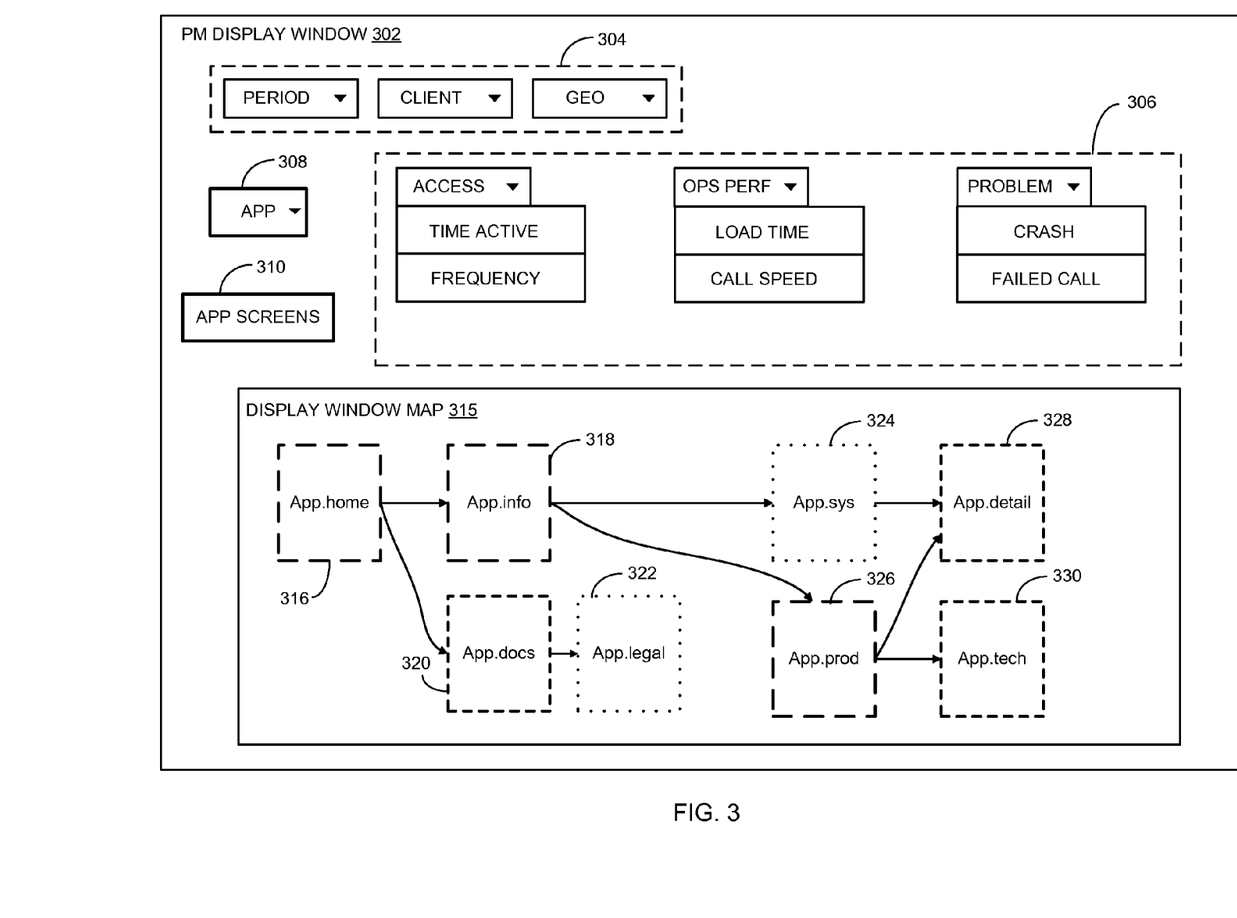
FIG. 3 is a block diagram depicting a performance monitoring display window object containing performance category objects, data collection filter metric objects, and an associated display window map in accordance with an embodiment.

FIG. 3 is a block diagram depicting a performance monitoring display window object 302 in accordance with an embodiment. Display window object 302 may be generated by a performance monitoring application, such as application 210, and be displayed on a computer display device. Display window object 302 includes performance category (PC) UI objects 306, data collection filter metric (CFM) UI objects 304, and an associated application display window map 315. In the depicted embodiment, CFM UI objects 304 include a PERIOD, a CLIENT, and a GEO UI object, each preferably including a user select button by which a user can select one of multiple items listed in respective drop-down menus (not depicted). For instance, PERIOD UI object may render a drop-down list from which a user may select various performance data collection periods such as "LAST 30 DAYS" and "ALL TIME." The CLIENT UI object may render a drop-down list from which a user may select from among different application client categories such as "BUYERS" and "SELLERS." The GEO UI object may render a drop-down list from which a user may select from among different geographic areas that performance data is collected from client applications such as "ASIA-PACIFIC" and "UNITED STATES."

PC UI objects 306 include an ACCESS, an OPS PERFORMANCE, and a PROBLEM UI object, each including a user select button object by which a user can select one of multiple items listed in a respective drop-down menu list. In the depicted embodiment, the ACCESS UI object corresponds to a display window access performance category relating to the manner in which a corresponding application display window is accessed by users. The ACCESS UI renders a first drop-down list from which a user may select from among a TIME ACTIVE and a FREQUENCY characterization of accesses respective application display windows. For example, TIME ACTIVE may specify a cumulative amount of time that an application display window was open/active while FREQUENCY may specify a number of instances that the display window was accessed over a period specified in the PERIOD CFM UI object.

The depicted OPS PERFORMANCE UI object corresponds to a display window performance category specifying particular types of operational performance metrics. The OPS PERFORMANCE UI renders a drop-down list from which a user may select from among a LOAD TIME metric that indicates the time required to load the corresponding application display window, and a CALL SPEED metric that indicates the time required to receive a response to a network call by the application. The depicted PROBLEM UI object corresponds to a display window performance category specifying an application failure event. The PROBLEM UI object renders a drop-down list from which a user may select from among a CRASH and a FAILED CALL characterization of application failure events. For instance, CRASH may correspond to performance data indicating occurrences in which the corresponding application stopped executing in a manner requiring application re-start. FAILED CALL may correspond to performance data indicating instances in which a network call generated by the application was dropped.

In combination, the selection signals received via PC UI objects 306 and CFM UI objects 304 are utilized to determine performance indicators to be displayed in association with images of the corresponding application display windows. The display windows for a particular application may be selected via an app select button 308 and app screens select button 310. For instance, after selecting an application, APP_1 using app select button 308, a user may further select the display object presentation illustrated in FIG. 3 by selecting app screens select button 310. In response to receiving the app selection and apps screen display selection input, the performance monitoring application renders the illustrated PC and CFM input selection mechanisms. In response to the input and processing of the user selections via the PC UI objects 306 and CFM UI objects 304, the performance monitoring application renders application display map 315 within the overall display 302.

Application display map 315 includes multiple display window images organized in accordance with the navigation sequence in which a user may access the display windows within the application. The navigation sequence is typically defined by logical, user-selectable links among the display windows of an application. In the depicted example, the display window image sequence begins with a home window 316 from which a user can directly navigate either to an info window 318 or to a docs window 320. The parallel paths from home window 316 to info window 318 and docs window 320 are visually rendered within application display map 315 such as by the depicted pointers. Similar visual pointers representative of navigation paths are illustrated from docs window 320 to legal window 322 and from info window 318 to sys window 324 and prod window 326. The sequence is completed as visually rendered by the pointers from sys window 324 to detail window 328, and from prod window 326 to detail window 328 and tech window 330.

In accordance with the depicted embodiment, each of the display window images is rendered together or in logical conjunction with a visual performance indicator. As shown in FIG. 3, the visual performance indicator may be a color-coded border overlayed on each of the display windows wherein the heavy dashed line corresponds to green, the medium dashed line to yellow, and the dotted line to red. For instance, assume the display map 315 is generated, in part, based on a performance category specifying ACCESS and further specifying FREQUENCY as the type of ACCESS. In the depicted embodiment, a green (heavy dashed) border is one variation of a performance indicator for the access frequency performance data that will be processed in response to the entries within the ACCESS UI object. Specifically, the green border may correspond to a high access frequency while yellow corresponds to a moderate access frequency and red corresponds to a low access frequency. In this case, the depicted performance indicators rendered as colored borders on each display window image demonstrates to a user that the home window 316, info window 318, and prod window 326 have each been frequently accessed during a time interval that may be specified by a selection signal received from the PERIOD CFM UI object. The depicted performance indicator further show that docs window 320, detail window, and tech window 330 have been moderately accessed and legal and system windows 322 and 324 have been infrequently accessed during the same monitoring period.

The comprehensive window display map rendered by display window 302 enables efficient, high-level visualization of application performance from developer, IT, and business analytics perspectives. Furthermore, the combination of navigation pointer indications with the per-display window performance indicators further facilitates visualization of inter-display window issues. In the depicted embodiment, for example, it can be quickly ascertained from the displayed performance indicators that most of the traffic to detail window 328 must be from navigations originating from prod window 326 rather than sys window 324.

Figure 4:
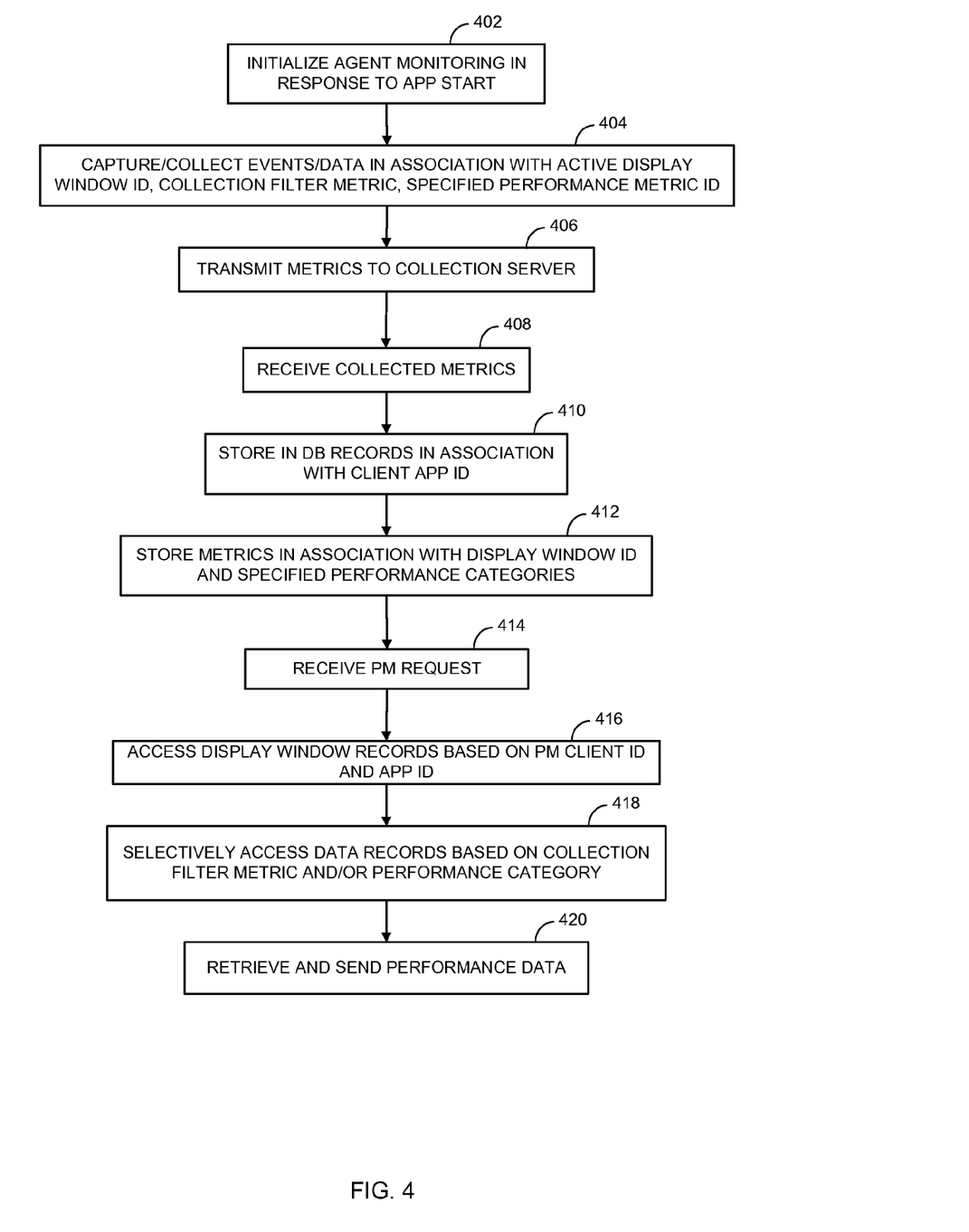
FIG. 4 is a flow diagram illustrating functions and operations for collecting and structurally processing and storing application performance data in accordance with an embodiment.

FIG. 4 is a flow diagram illustrating functions and procedures for collecting and structurally storing and accessing application performance data in accordance with an embodiment. The process begins as shown at block 402 with a monitoring agent on a client device initializing in response to or as part of activation of a target application. The target application may be one of many mobile applications that are systematically monitored by such monitoring agents that may be loaded onto the client device as a distinct application or may be dynamically or statically linked or otherwise integrated with the target application code. At block 404, the monitoring agent captures and collects performance data generated contemporaneously with each application display window that is accessed. The performance data may include operation and/or access speed, accesses to a display window, application crashes, etc. The monitoring agent may associate the performance data with an active display window ID and a collection filter metric such as a point in time. The monitoring agent may further associate the performance data with a performance category ID such as process speed. The performance data as well as associated identifiers are transmitted from the monitoring agent to a collection server as shown at block 406.

The performance data with associated identifiers is received by the collection server and stored in associated with an application ID within a collection server database (blocks 408 and 410). The collection server may allocate multiple performance data records for each of multiple display windows records corresponding to the received display window IDs. The collection server may further associate performance data within each of the records with performance categories corresponding to the received performance category ID (block 412). As part of the function depicted at block 412, the collection server may also include the collection filter metrics within the performance data records.

As depicted a block 414, the collection server may receive a request for data collected during performance monitoring. In response to the request, the collection server accesses the multiple display window records for the target application based, for example, on a received performance monitoring client ID and an application ID (block 416). The collection server may send all performance data corresponding to the display window records to the requesting client or may further selectively access individual data records based on a combination of the collection filter metric and/or the performance category (step 418). The collection server then transmits the selected records and/or the performance data contained therein to the requesting performance monitoring client (block 420).

Figure 5:
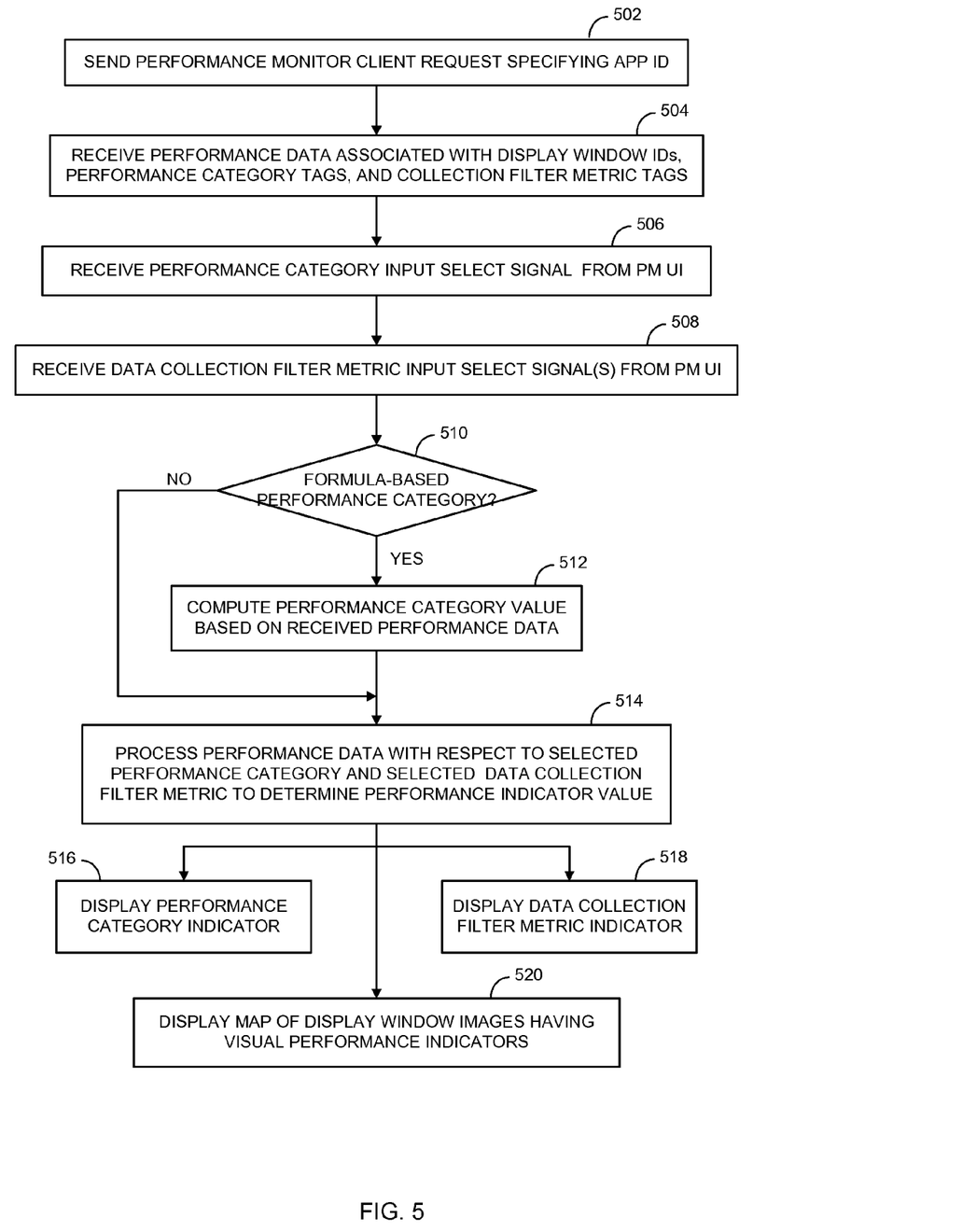
FIG. 5 is a flow diagram depicting functions and operations for displaying application performance data in accordance with an embodiment.

FIG. 5 is a flow diagram depicting functions and operations for displaying application performance data in accordance with an embodiment. The process begins as shown at block 502 with a performance monitoring client transmitting a request for performance data to a collection server. In an embodiment, the request specifies a requestor (client) ID, and an application ID with the request directed to retrieving all performance data associated with a given target application. In another embodiment, the request may further specify a collection filter metric, such as a time period or geographic area, to be processed by the collection server to selectively respond with only those data records corresponding to the specified filter metric. In addition to or in place of the collection filter metric, the request may specify a performance category that the collection server may similarly utilize to selectively retrieve corresponding data records.

At block 504, the requesting client receives a response from the collection server that includes performance data that is associated with respective display window IDs, performance categories, and collection filter metrics. Display of the received performance data may begin with a performance monitoring application receiving a performance category input selection signal and a collection filter metric input selection signal (blocks 506 and 508). In an embodiment, the input selection signals may be received from corresponding PC and CFM UI objects such as those depicted in FIG. 3. In an embodiment, multiple, lower-level performance data types may be processed in combination such as a formula computation to generate higher-level performance category values. In such a case, and as shown at blocks 510 and 512, values corresponding to the performance categories received at block 506, may be computed based on combinations of different types of performance data.

At block 514, the performance monitoring application processes the performance data received at block 504 based on the performance category and the collection filter metrics received in the selection signals. At shown at blocks 516 and 518, the performance monitoring application displays an indictor corresponding to the selected performance category and an indicator corresponding to the selected collection filter metric. As shown at block 520, in response to the block 514 processing of the performance data, the performance monitoring application displays, simultaneously with the performance category indicator and the collection filter metrics, a display window map for the target application. In an embodiment, the display window may contains objects displaying the performance indicators overlapping, bordering, or otherwise proximately positioned with respect to corresponding images of each of the application's display windows. In an embodiment, the objects comprise screen capture objects on which are overlayed visual codes, such as color-coded rectangular borders, corresponding to each of the determined performance indicators.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
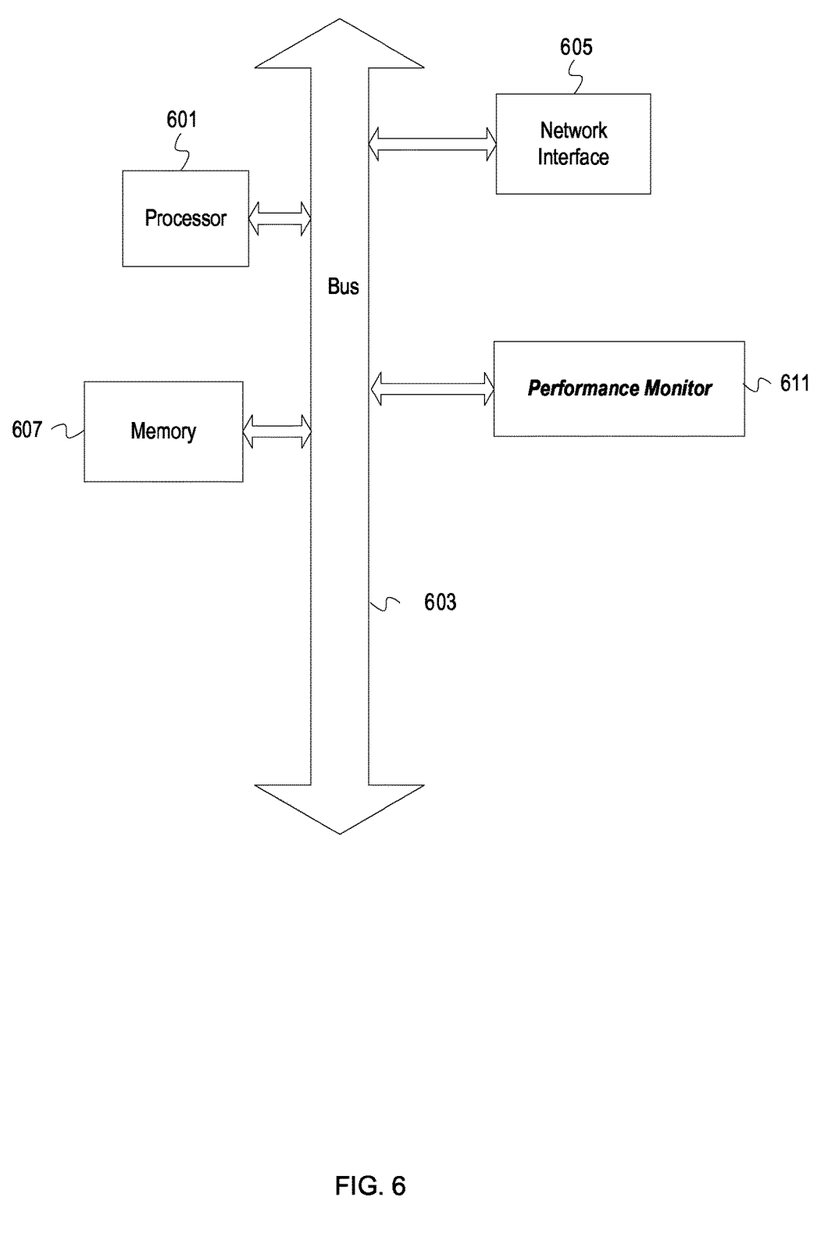
FIG. 6 depicts an example computer system that includes a performance monitoring system in accordance with an embodiment.

FIG. 6 depicts an example computer system that implement application performance monitoring and analytics. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a performance monitoring system 611. The performance monitoring system 611 provides program structures for collecting, storing, and displaying performance indicators in association with display window images to form an application display windows map. The performance indicators may be determined based on performance data that may include operational metrics, operational events, and user transaction data. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for an object storage backed file system that efficiently manipulates namespace as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:

1. A method for displaying application performance data, said method comprising:
   logically associating, by a processor, performance data collected from an application with an identifier (ID) of a display window that is generated by the application, wherein said logically associating the performance data includes generating a record that includes a performance data field containing a portion of the collected performance data, a performance category field containing an application performance category, a data collection filter metric field containing a criterion for collecting the performance data, and a display window ID field containing a display window ID value;
   determining, by the processor, a displayable performance indicator that is visually modifiable to correlate to variations in the collected performance data;
   receiving, by the processor, a performance category selection signal;
   receiving, by the processor, a data collection filter metric selection signal that specifies a non-performance related criterion; and
   simultaneously displaying, by the processor on a display device,
      an indicator of a performance category based on the performance category selection signal;
      an indicator of a data collection filter metric based on the data collection filter metric selection signal; and
      the displayable performance indicator individually associated with an image of the display window.

2. The method of claim 1, wherein the received performance category selection signal specifies an application performance category, and wherein said determining the displayable performance indicator comprises selecting, by the processor, the displayable performance indicator based, at least in part, on the specified application performance category.

3. The method of claim 1, wherein the received data collection filter metric selection signal specifies a data collection filter metric, and wherein said determining the displayable performance indicator comprises selecting, by the processor, the displayable performance indicator based, at least in part, on the specified data collection filter metric.

4. The method of claim 1, further comprising selecting, by the processor, based on the application, a criterion for determining a correlation between the displayable performance indicator and variations in the collected performance data.

5. The method of claim 1, further comprising:
   collecting, by the processor, on an application client device, performance data associated with the application; and
   during said collecting the performance data, determining, by the processor, a currently displayed display window.

6. The method of claim 1, wherein said logically associating the performance data comprises:
   allocating, by the processor, multiple storage containers that are each associated with a respective display window; and
   selecting, by the processor, from among the multiple storage containers, a storage container in which to store performance data based on an identifier (ID) of a display window that is generated by the application.

7. The method of claim 6, wherein the multiple storage containers comprise database entries.

8. The method of claim 1, wherein said determining the displayable performance indicator comprises:

accessing, by the processor, performance data based on,
the received performance category selection signal; and
the received data collection filter metric selection signal;

comparing, by the processor, the performance data to a performance threshold value; and selecting, by the processor, the displayable performance indicator based on said comparing the performance data to the performance threshold value.

9. The method of claim 1, wherein said simultaneously displaying further comprises displaying, by the processor, an image of a graphical display object that is generated by the application, and wherein the displayed image of the graphical display object includes the displayable performance indicator.

10. One or more non-transitory machine-readable storage media having program code for displaying application performance data stored therein, the program code comprising instructions to:
logically associate, by a processor, performance data collected from an application with an identifier (ID) of a display window that is generated by the application, wherein said instructions to logically associate the performance data includes instructions to generate a record that includes a performance data field containing a portion of the collected performance data, a performance category field containing an application performance category, a data collection filter metric field containing a criterion for collecting the performance data, and a display window ID field containing a display window ID value;
determine, by the processor, a displayable performance indicator that is visually modifiable to correlate to variations in the collected performance data;
receive, by the processor, a performance category selection signal;
receive, by the processor, a data collection filter metric selection signal that specifies a non-performance related criterion; and
simultaneously display, by the processor on a display device,
an indicator of a performance category based on the performance category selection signal;
an indicator of a data collection filter metric based on the data collection filter metric selection signal; and
the displayable performance indicator individually associated with an image of the display window.

11. The one or more non-transitory machine-readable storage media of claim 10, wherein the received performance category selection signal specifies an application performance category, and wherein said determining the displayable performance indicator comprises selecting, by the processor, the displayable performance indicator based, at least in part, on the specified application performance category.

12. The one or more non-transitory machine-readable storage media of claim 10, wherein the program code further comprises instructions to:
collect, by the processor, on an application client device, performance data associated with the application; and
during said collecting the performance data, determine, by the processor, a currently displayed display window.

13. The one or more non-transitory machine-readable storage media of claim 10, wherein said logically associating the performance data comprises:

allocating, by the processor, multiple storage containers that are each associated with a respective display window; and selecting, by the processor, from among the multiple storage containers, a storage container in which to store performance data based on an identifier (ID) of a display window that is generated by the application.

14. The one or more non-transitory machine-readable storage media of claim 10, wherein said determining the displayable performance indicator comprises:
accessing, by the processor, performance data based on,
the received performance category selection signal; and
the received data collection filter metric selection signal;

comparing, by the processor, the performance data to a performance threshold value; and selecting, by the processor, the displayable performance indicator based on said comparing the performance data to the performance threshold value.

15. The one or more non-transitory machine-readable storage media of claim 10, wherein said simultaneously displaying further comprises displaying, by the processor, an image of a graphical display object that is generated by the application, and wherein the displayed image of the graphical display object includes the displayable performance indicator.

16. An apparatus comprising:
a processor; and
a non-transitory machine-readable storage medium storing program code executable by the processor to cause the apparatus to:
logically associate performance data collected from an application with an identifier (ID) of a display window that is generated by the application, wherein said logically associating the performance data includes generating a record that includes a performance data field containing a portion of the collected performance data, a performance category field containing an application performance category, a data collection filter metric field containing a criterion for collecting the performance data, and a display window ID field containing a display window ID value;
determine a displayable performance indicator that is visually modifiable to correlate to variations in the collected performance data;
receive a performance category selection signal;
receive a data collection filter metric selection signal that specifies a non-performance related criterion; and
simultaneously display, on a display device,
an indicator of a performance category based on the performance category selection signal;
an indicator of a data collection filter metric based on the data collection filter metric selection signal; and
the displayable performance indicator individually associated with an image of the display window.

17. The apparatus of claim 16, wherein the received performance category selection signal specifies an application performance category, and wherein said determining the displayable performance indicator comprises selecting the displayable performance indicator based, at least in part, on the specified application performance category.

18. The apparatus of claim 16, wherein the non-transitory machine-readable storage medium further stores program code executable by the processor to cause the apparatus to:
collect, on an application client device, performance data associated with the application; and during said collecting the performance data, determine a currently displayed display window.

19. The apparatus of claim 16, wherein said logically associating the performance data comprises:
allocating multiple storage containers that are each associated with a respective display window; and
selecting, from among the multiple storage containers, a storage container in which to store performance data based on an identifier (ID) of a display window that is generated by the application.

20. The apparatus of claim 16, wherein said determining the displayable performance indicator comprises:
accessing performance data based on,
the received performance category selection signal; and
the received data collection filter metric selection signal;
comparing the performance data to a performance threshold value; and
selecting the displayable performance indicator based on said comparing the performance data to the performance threshold value.

\* \* \* \* \*